United States Patent Office 3,446,332
Patented May 27, 1969

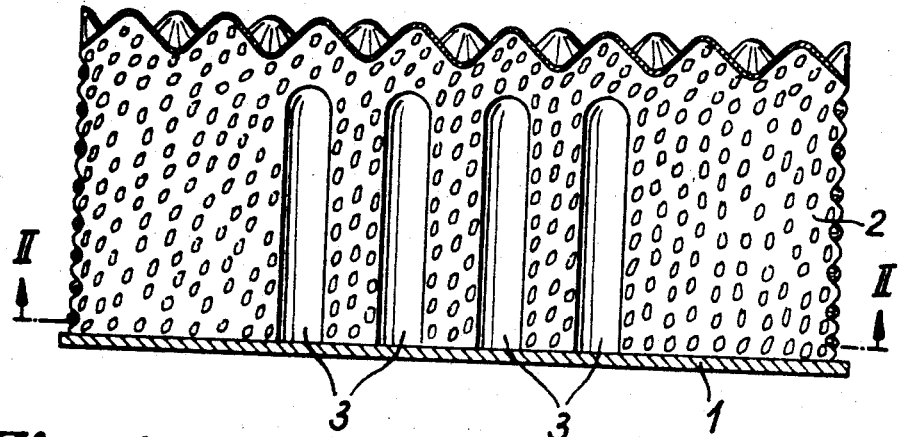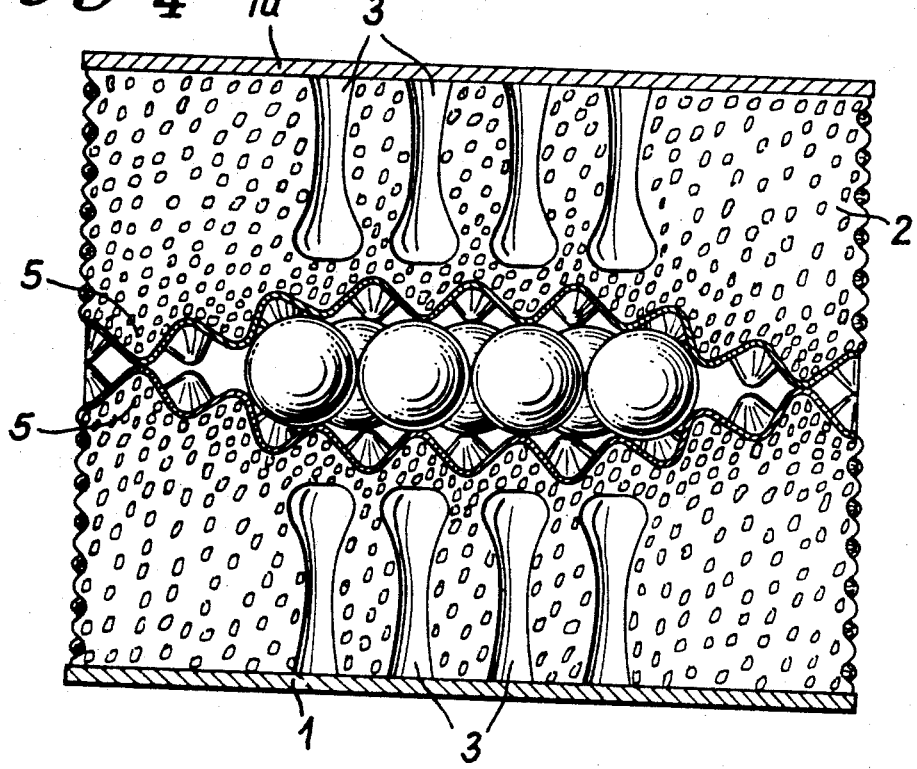

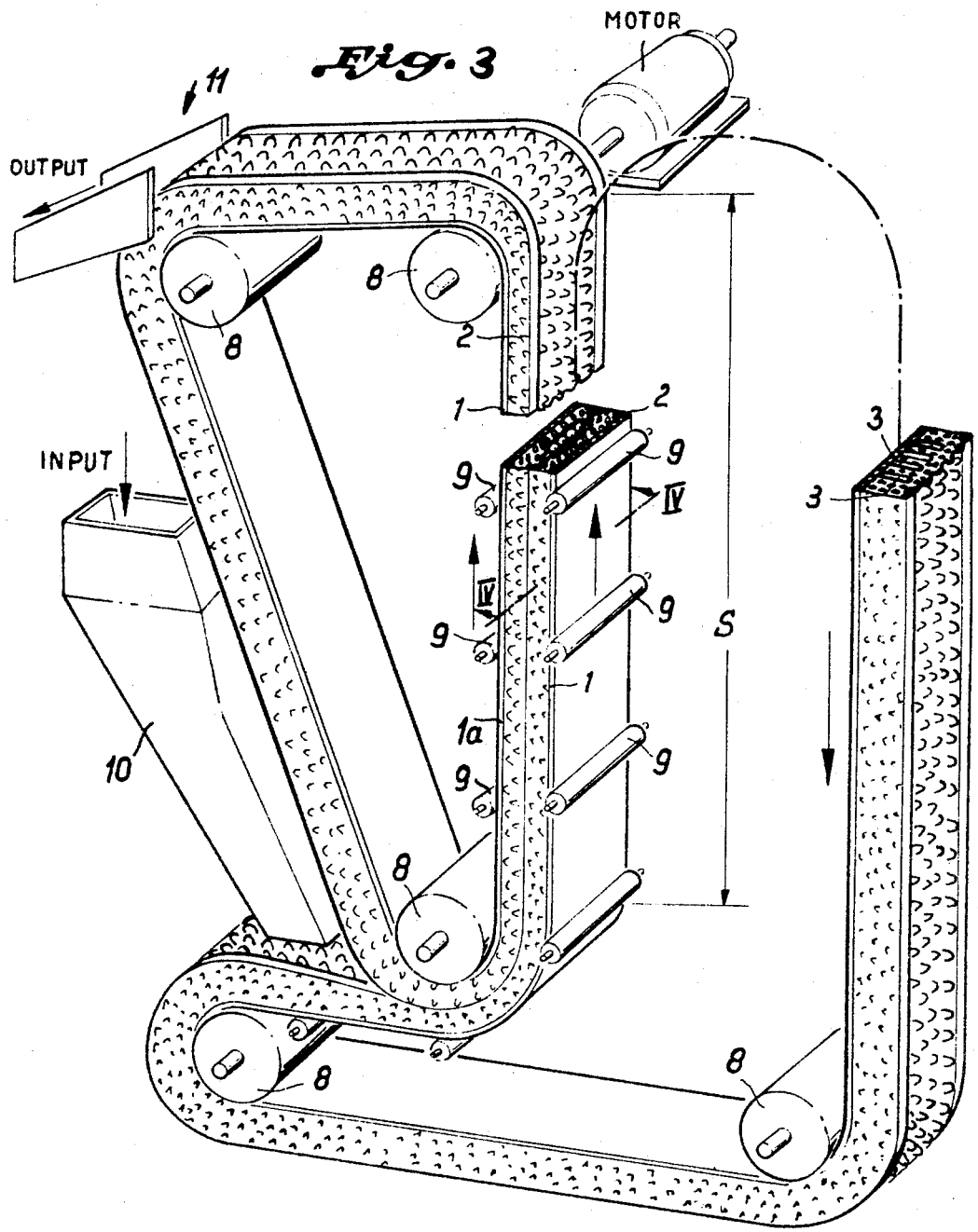

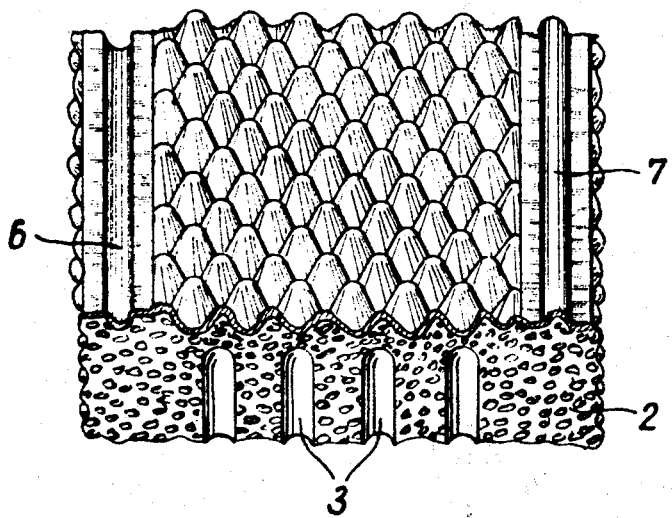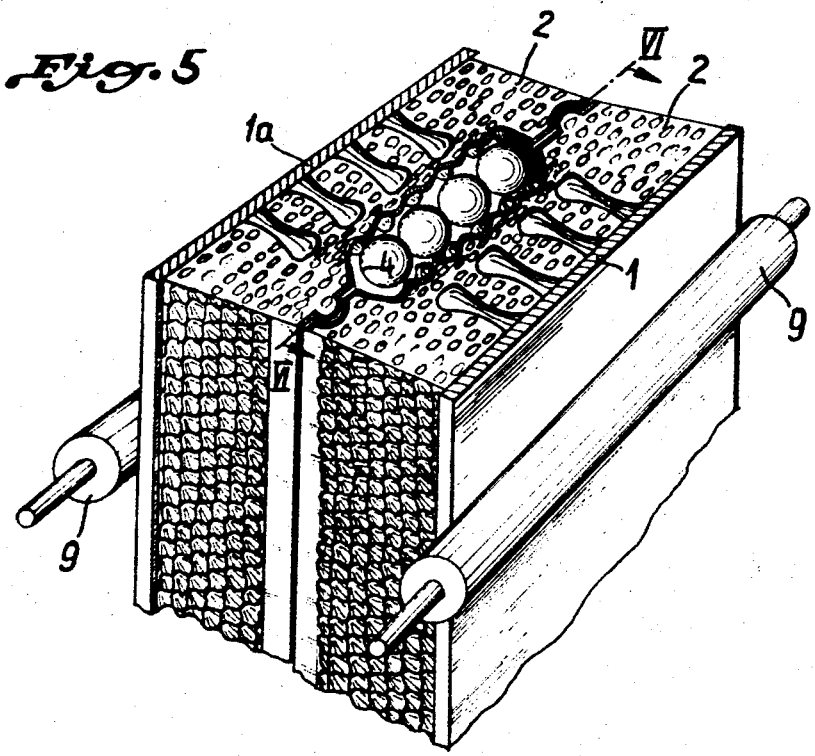

3,446,332
STEEP CONVEYOR INSTALLATION
Gert Bechtloff, Wilhelmshaven, Germany, assignor to Beteiligungs- und Patentverwaltungsgesellschaft mit beschrankter Haftung, Essen, Germany
Filed June 8, 1967, Ser. No. 644,624
Claims priority, application Germany, Oct. 29, 1966, B 89,626
Int. Cl. B65g 15/14, 15/42
U.S. Cl. 198—165         3 Claims

ABSTRACT OF THE DISCLOSURE

The present invention relates to a steep conveyor installation in which two conveyor belts have two sides facing each other over a steep conveyor section while the said two conveyor belts are provided with layers of foam material adapted to encase the material to be elevated therebetween. This invention is particularly directed to the foam material which is characterized primarily, in that it is provided with cavities in the central portion only of the foam material layer, but not in the marginal zones of said layer. These cavities extend from that side of the foam material layer which is connected to the backing or belt in the direction to the opposite side of the foam material layer, but ending in spaced relationship thereto. When the foam material layer is compressed in the steep section of the conveyor, only the central portion of the foamed material layer is compressed and forms a kind of trough with the lateral zones of said layer forming the side walls of said trough.

---

The present invention relates to a steep conveyor installation in which two conveyor belts have two sides facing each other over a steep conveyor section while the said two conveyor belts are provided with layers of foam material adapted to encase the material or goods to be elevated therebetween. In order to prevent with such conveyor installations the goods in the steep conveyor section, especially when they are pourable, from escaping laterally between the marginal areas of the foam material layers, it is known so to design the foam material layers that at the marginal areas of each foam layer on the supporting side thereof strips are formed which protrude with regard to the central portion of the foam material layer. Over the steep conveyor section, the said strips facing each other are in view of the yieldability of the foam material pressed against each other to such an extent that they no longer protrude relative to the central adjacent area of the foam material layer. In other words, in such instances the inwardly directed marginal areas of the foam material layers will over the steep conveyor section be located approximately in the same plane as the central portion of the foam material layers if there is no material to be elevated between said layers. When pourable material is to be elevated, the central portions of the foam material layers yield and form a hollow chamber for receiving the pourable goods whereas the marginal areas of the two foam layers will in view of the strong compression thereof remain in firm engagement with each other so that no pourable goods can escape laterally.

A steep conveyor installation of this type is disclosed for instance in assignee's copending application Ser. No. 626,542 filed Mar. 28, 1967 in the name of Gert Bechtloff and Reinhold Szonn and entitled "Conveyor Installation and Conveyor Belt System Therefor."

It is an object of the present invention to provide a steep conveyor installation of the above mentioned type in which the foam material layers will have a simplified shape.

It is another object of this invention to provide a steep conveyor installation as set forth in the preceding paragraph which can be more economically produced than the foam material layers of heretofore known steep conveyor installations.

These and other objects and advantages of the invention will appear more clearly from the following specification in connection with the accompanying drawing, in which:

FIG. 1 diagrammatically illustrates a cross section through a conveyor belt according to the invention with a foam material layer while under no load, said section being taken along the line I—I of FIG. 2.

FIG. 2 is a section along the line II—II of FIG. 1.

FIG. 3 diagrammatically illustrates a conveyor installation with belts according to the present invention.

FIG. 4 is a cross section through two conveyor belt portions in the steep conveyor belt section with the foam material layers pressed against each other and with goods therebetween, said section being taken along the line IV—IV of FIG. 3.

FIG. 5 is an isometric section similar to FIG. 4 through two somewhat modified belt portions in the steep conveyor belt sections.

FIG. 6 is a section along the line VI—VI of FIG. 5.

Figure 2:
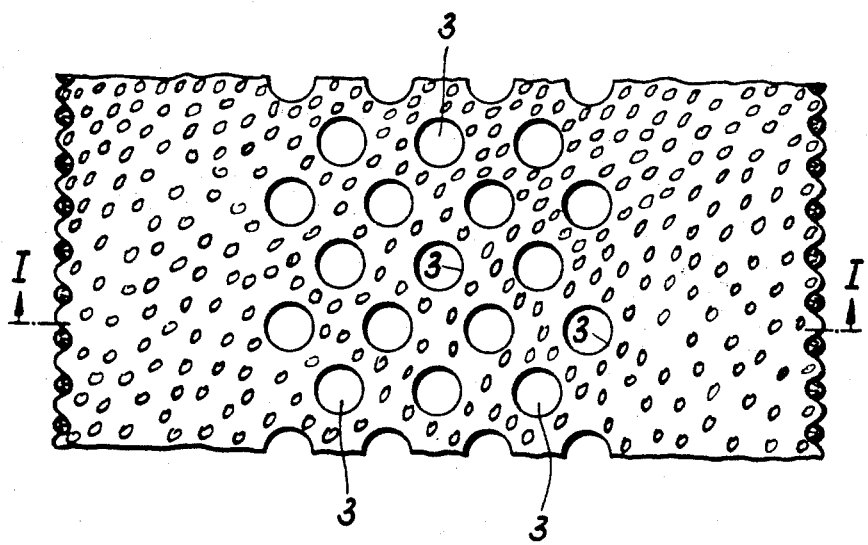

The steep conveyor installation with two conveyor belts according to the present invention is characterized primarily in that the foam material layer of at least one of the two conveyor belts has its central portion exclusively between the two marginal areas provided with cavities extending from the belt or backing in the direction toward the opposite side of the foam layer but spaced therefrom so that when the foam material is compressed over the steep section of the conveyor, the central portion provided with cavities will yield while the marginal areas will remain and protrude relative to said central portion in a direction away from said backing.

For the sake of completeness, it may be stated that it has been suggested to provide foam material layers for a steep conveyor installation with hollow conical cavities which are open on that side of the foam material layer which is remote from the backing therefor, said cavities being uniformly distributed over the entire foam material layer, including the marginal areas. Such a design, however, will when the foam material layers are compressed, not produce marginal protruding areas for effecting a lateral closure. The purpose of the cavities in this known design consists merely in reducing the specific weight of the foam material and in reducing the price therefor.

Referring now to the drawing in detail, each of the two conveyor belts 1, 1a is covered with a foam material layer 2 which is fixedly connected thereto. Such foam material layer may for instance be a foamed synthetic material, as for example cellular polyurethane and may be connected to belts 1, 1a by cementing or vulcanizing.

When the belt is under no load or under no compression, the synthetic material layer 2 has an approximately rectangular cross section as shown in FIG. 1. However, if desired, the lateral surfaces may be slightly inclined so as to confine with the vertical an angle of for instance 15°. The material engaging side has its surface located in a plane without protuding marginal areas but is preferably provided with slight elevations and depressions in the form of a waffle pattern.

The central portion of at least one of the foam material layers between the two marginal zones is provided with cylindrical cavities 3 which extend from the belt or backing 1, 1a in the direction toward the opposite side of the foam material layer but having the ends of the cavities spaced therefrom. These cavities 3 are offset with regard to each other in the longitudinal direction of the belt as is shown in FIG. 2.

When in the steep conveyor section the material to be conveyed, for instance balls 4, is clamped between the foam material layers 2 of the two conveyor belts, the central portion of the foam material layers are depressed as shown in FIGS. 4 and 5 of the drawings, whereas the marginal zones having no cavities and will be compressed only slightly. Consequently, marginal strips 5 will remain which will prevent a lateral escape of the material.

If the conveyor is primarily intended for conveying very fine granular material, it may be advantageous to provide the marginal areas of each belt with a groove 6 and an elevation 7 respectively. The arrangement is such that a groove 6 of one belt is engaged by an elevation 7 of the other belt as shown in FIG. 5.

The cavities 3 can easily be realized by means of corresponding cores in a simple foaming mold and can have various shapes, as for instance an inwardly tapering hollow conical shape.

Under some circumstances, it is sufficient that only the foam material layer of one of the two conveyor belts has its central portion provided with cavities whereas the foam material layer of the other belt which is likewise of a substantially rectangular profile has no cavities or has cavities uniformly distributed over the entire width of the layer. In such an instance, in the steep conveyor section, the marginal strips would be formed only with the foam material layer according to the invention. This will in many instances suffice to prevent an escape of the material being conveyed laterally from the conveyor.

As will be seen from the above, the present invention brings about the advantage that the foam material layers can be produced with a very simple substantially rectangular profile which is considerably more economic than the formation of foam material layers which from the very start are formed with materially protruding zones.

The arrangement of the belts in the conveyor is shown in FIG. 3 according to which the belts 1, 1a are supported by main rollers 8 and auxiliary rollers 9, the latter pressing the belts against each other primarily over the steep path S. At least one of the main rollers 8 is driven by a motor. The material to be conveyed by the conveyor is charged thereonto through a chute 10 and leaves the conveyor at 11.

It is, of course, to be understood that the present invention is, by no means, limited to the particular design shown in the drawing but also comprises any modifications within the scope of the appended claims.

What I claim is:
1. A conveyor installation with a steep conveying path, which includes: two endless conveyor belts having a conveying section thereof arranged in face to face relationship over said steep conveying path, each of said belts comprising a first layer of strong load supporting flexible material and a second layer of soft elastic foam material firmly connected to said first layer, that surface of said second layer which faces away from said first layer being provided with elevations and depressions so as to form a waffle-patterned surface, at least one of said two belts having its intermediate portion between its marginal areas and said intermediate portion only provided with cavities having a greater length than width and extending from that surface of said second layer which faces said first layer in the direction toward said waffle-patterned surface but ending in spaced relationship to said waffle-patterned surface whereby when said belts along said steep conveying path are pressed against opposite marginal areas of said belts, said belts will form lateral mutually engaging zones preventing lateral escape of goods caught between said intermediate portions of said second layers.

2. A conveyor belt for use in connection with conveyor installations having a steep conveying path, which comprises: a first layer of strong load supporting flexible material, and a second layer of soft elastic foam material connected to said first layer, that surface of said second layer which faces away from said first layer being provided with elevations and depressions to form a waffle-patterned surface, said second layer across the width thereof having its intermediate portion between its marginal areas and said intermediate portion only provided with cavities extending from that surface of said second layer which faces said first layer in the direction toward said waffle-patterned surface but ending in spaced relationship thereto.

3. A conveyor belt according to claim 2, in which said cavities are staggered in the longitudinal direction of said belt.

References Cited

UNITED STATES PATENTS

| 2,684,781 | 7/1954 | Allen | 198—165 |
| 3,319,776 | 5/1967 | Bechtloff | 198—165 |

FOREIGN PATENTS

| 810,016 | 3/1959 | Great Britain. |
| 1,196,759 | 11/1959 | France. |

RICHARD E. AEGERTER, *Primary Examiner.*

U.S. Cl. X.R.

198—149, 208; 214—15